United States Patent
De Wit et al.

(10) Patent No.: US 7,912,197 B2
(45) Date of Patent: Mar. 22, 2011

(54) CONFERENCE SYSTEM DISCUSSION UNIT WITH EXCHANGEABLE MODULES

(75) Inventors: Ruud De Wit, Geertruidenberg (NL); Marc Van Loon, Roosendaal (NL)

(73) Assignee: Robert Bosch GmbH, Stuttgart (DE)

( * ) Notice: Subject to any disclaimer, the term of this patent is extended or adjusted under 35 U.S.C. 154(b) by 1244 days.

(21) Appl. No.: 10/590,857

(22) PCT Filed: Sep. 9, 2005

(86) PCT No.: PCT/EP2005/054499
§ 371 (c)(1),
(2), (4) Date: Aug. 25, 2006

(87) PCT Pub. No.: WO2007/028423
PCT Pub. Date: Mar. 15, 2007

(65) Prior Publication Data
US 2008/0240393 A1    Oct. 2, 2008

(51) Int. Cl.
*H04M 3/42* (2006.01)
(52) U.S. Cl. .............................. 379/204.01; 379/428.01
(58) Field of Classification Search .................. 379/202, 379/204, 202.01, 204.01
See application file for complete search history.

(56) References Cited

U.S. PATENT DOCUMENTS

| | | | | |
|---|---|---|---|---|
| 4,717,190 A | * | 1/1988 | Witherspoon | 294/99.2 |
| 6,216,339 B1 | * | 4/2001 | Rich | 29/762 |
| 7,229,111 B2 | * | 6/2007 | Cohen et al. | 294/99.2 |
| 7,346,654 B1 | * | 3/2008 | Weiss | 709/204 |
| 2003/0059025 A1 | * | 3/2003 | Meyerson et al. | 379/220.01 |
| 2005/0022621 A1 | * | 2/2005 | Kusano | 74/335 |
| 2005/0257369 A1 | * | 11/2005 | Daily et al. | 29/832 |
| 2005/0271194 A1 | * | 12/2005 | Woods et al. | 379/202.01 |

FOREIGN PATENT DOCUMENTS

| | | |
|---|---|---|
| EP | 0 484 793 | 5/1992 |
| EP | 1 320 244 | 6/2003 |
| JP | 7030627 | 1/1995 |
| JP | 7322229 | 12/1995 |

* cited by examiner

*Primary Examiner* — Curtis Kuntz
*Assistant Examiner* — Amal Zenati
(74) *Attorney, Agent, or Firm* — Michael J. Striker

(57) ABSTRACT

A discussion unit (6) for use in a conference system (8) is disclosed, which is adapted to be connected to at least one second discussion unit (6) of the conference system (8). The discussion unit (6) is switchable between at least two operating modes. The discussion unit (6) further comprises at least one exchangeable control (420) out of a set of controls comprising at least one control for each of the operating modes, wherein the at least one exchangeable control (420) is adapted to indicate to a user the operating mode currently used and to allow for the user to control the discussion unit (6).

10 Claims, 4 Drawing Sheets

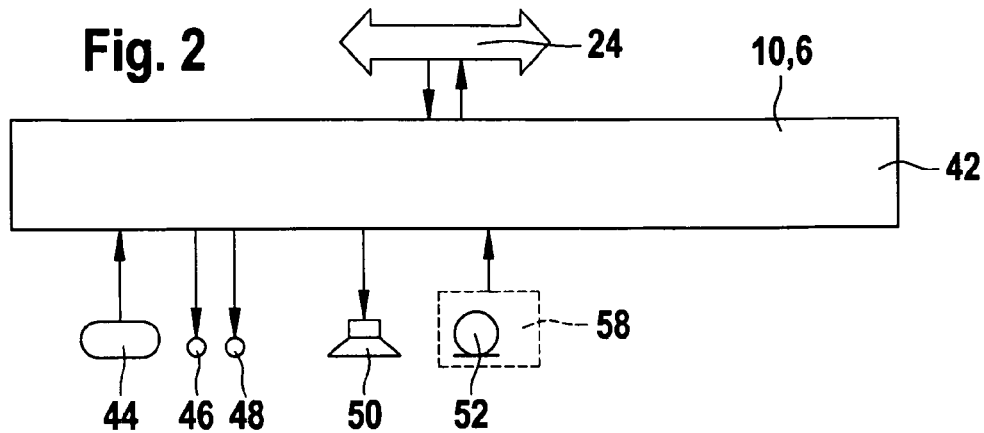
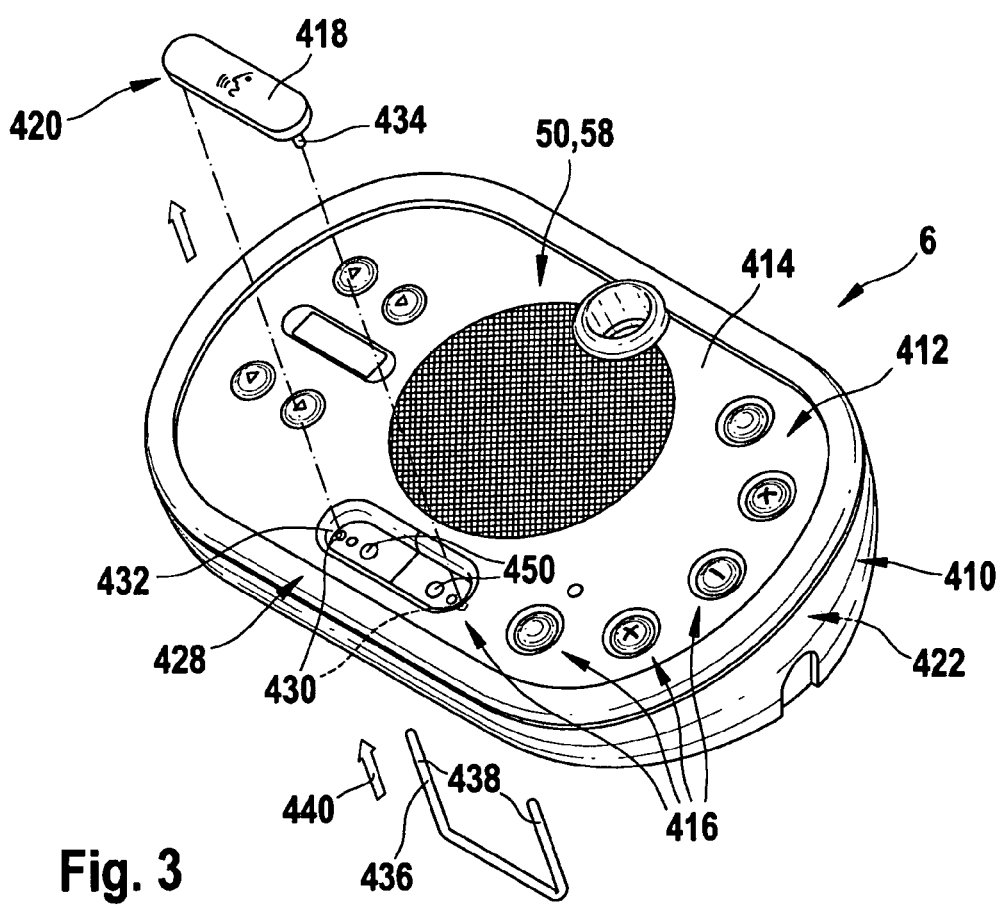

CONFERENCE SYSTEM DISCUSSION UNIT WITH EXCHANGEABLE MODULES

CROSS-REFERENCE TO A RELATED APPLICATION

The invention described and claimed hereinbelow is also described in German Patent Application PCT/EP 2005/054499 filed on Sep. 9, 2005. This German Patent Application, whose subject matter is incorporated here by reference, provides the basis for a claim of priority of invention under 35 U.S.C. 119(a)-(d).

BACKGROUND OF THE INVENTION

The invention discloses a multi-functional discussion unit for use in a conference system. The invention further discloses a conference system comprising at least two of the discussion units. Further, an ejector tool for exchanging at least one control from the casing of the discussion unit is disclosed.

In the following, the expression "discussion unit" is used as a generic expression with respect to a unit to be used by a conference delegate ("delegate discussion unit") or a unit to be used by a chairman ("chairman unit"). A system comprising at least two discussion units is referred to as a "conference system". Nevertheless, besides the discussion units, the conference system may comprise other components.

Conference Systems are used to facilitate discussions between participants of conferences or meetings. The conference systems typically are installed (permanently or non-permanently) in the conference rooms or conference halls for private or public use. These conference systems typically are adapted to allow for a speaker to give a speech using a microphone, and for a chairman of the conference to control the speech, such as by switching on or off the speaker's microphone.

Conference systems are known from prior art. Thus, EP 0 484 793 A1 discloses a communication system and a central processing unit as well as a communication station in the communication system. The communication system comprises a central processing unit and a plurality of communication stations, in which the central processing unit and the communication stations are coupled over an uplink signal line and a downlink signal line.

Nevertheless, conference or communication systems as known from prior art are rather cost-intensive, which is mostly due to the fact that these conference systems comprise a large number of single components, wherein the number of components required increases with the size of the conference hall and/or the number of participants of the conference. Thus, typically, the conference system has to comprise a delegate unit for each and every delegate of the conference, in order to allow for the possibility of each delegate to give a speech or to add comments to the conference without the need of stepping to a central microphone.

Therefore, the conference systems and/or the discussion units have to be tailored towards the required functionality for use in a certain conference room. Thus, the delegate units typically have to be adapted to the facility in each and every case, which means that, if additional features have to be installed according to the customers wishes, the delegate units of the conference system have to be tailored accordingly. In general, this tailoring will be done only once by the installer, and occasionally more than once, e.g. when a rental company intends to change the discussion units from single to dual use.

This need for modifications with regard to functionality and/or design imposes a major problem on the manufacturers or distributors of the conference system. Either the conference system has to be pre-designed and kept on stock in a large number of different varieties and functionalities, or the conference system has to be modified according to the requirements of the customer for each and every order of a conference system. Both alternatives involve high costs, either for the design change or stocking costs. Nevertheless, even if a large variety of different conference systems is on stock, the design of the conference system and the functionality of the conference system typically is predetermined and, thus, fixed. Thus, in a case of a non-stationary conference system (e.g. a conference system, which is installed in a conference hall, which is not permanently used as a conference hall, such as a sports facility), the re-use of the conference system after the de-installation of the conference system in one location imposes major problems on the provider of the conference system.

SUMMARY OF THE INVENTION

Therefore, a discussion unit and a conference system comprising at least two discussion units are disclosed, which allow for a high flexibility with regard to the type of conference and/or the functionality and/or the design of the conference system and the discussion unit.

The discussion unit may comprise at least one microphones, which may be an internal microphone and/or an external microphone, allowing for a participant of the conference to add comments to a discussion or give a speech. The discussion unit is adapted to be connected to at least one second discussion unit of the conference system. This "connection" may be designed in various ways, like a cable system and/or one or more wireless connections. Other ways of connecting are known to the person skilled in the art. Further, the connection might be a "direct" connection from unit to unit, and/or it might comprise an "indirect" connection via a central unit or central system. Thus, a connection using a "loopthrough" topology and/or a "star" topology might be used. Other alternative embodiments are known to the person skilled in the art.

One basic idea of the invention is the idea of giving the discussion unit the highest possible flexibility in terms of the potential use of the discussion unit, the potential design and/or the potential functionality. Thus, the discussion unit is switchable between at least two operating modes. Therefore, the discussion unit may, e.g., comprise at least one configuration switch. The discussion unit may comprise means for operating at least two of the following operating modes, wherein the at least one configuration switch is designed (e.g. by providing different "mode positions" which may be selected by a service technician) in order to enable a choice between the following operating modes:

A first potential operating mode may be a "single user delegate mode". In this mode, the discussion unit is used as a discussion unit, which means a unit, which is meant to support a single delegate participating in a conference. A second potential operating mode may be a "dual user delegate mode". In this mode, the discussion unit is a discussion unit for two delegates participating in the conference. In other words, two delegates may share a single discussion unit, wherein the conference system recognizes which of the two delegates currently uses the discussion unit. A third potential mode may be a "chairman mode". In this mode, the discussion unit is adapted to a control state of at least one microphone of at least one discussion unit (most preferably of a delegate unit), preferably by switching the state of this discussion unit from a speak-state into a mute-state or vice versa. Thus, a chairman of a conference may use a "speak" button to speak (even if a maximum number of open microphones has been reached), or the chairman may use a priority button to overrule a discussion, which means that all microphones of the delegates are switched off momentarily, and, optionally, a chime is produced by the conference system. Other or alternative functionalities of the chairman mode are possible. An optional fourth mode, which might be included, is a "single user delegate mode with auxiliary control". In this mode, the discussion unit is a discussion unit for a single delegate (delegate unit) participating in the conference, which, additionally to the single user delegate mode described above, offers to the delegate an auxiliary control option. Further details of the operating modes and potential embodiments will be given below. Other, additional or alternative operation modes than the ones described herein may be possible.

The at least one configuration switch may comprise a hardware switch and/or a software switch or may simply comprise switching by wiring (preferably without the need of soldering) or setting jumpers.

Additionally to the at least one switch, the outer design and functionality of the discussion unit is adaptable to the operating mode by implementing at least one exchangeable control out of the set of controls into the discussion unit. Thus, at least one control for each of the operating modes of the discussion unit may be provided. The at least one exchangeable control is be adapted to indicate to a user the operating mode currently used by the discussion unit (such as by visual indicators like simple symbols etc.) and allows for the user to control the discussion unit. Preferably, the at least one exchangeable control may comprise at least one button, preferably an exchangeable push-button.

In order for an installer or a service technician to be able to exchange the controls of the discussion unit when switching between operating modes, an ejector facility may be included. This ejector facility preferably prevents a participant of the conference from removing the exchangeable control. Thus, since in many cases of long conferences a certain play instinct sets in with the participants, the discussion units are protected against unintended disassembly. The service technician using the ejector facility on the other hand is capable of exchanging the control, in order to modify the features of the discussion unit. Thus, the service technician may use a tool adapted for removing and/or exchanging the at least one exchangeable control. E.g., the ejector facility may allow for a removal of the controls of the discussion unit from the backside of the discussion unit. Thus, openings may be provided, allowing for pushing the controls out of the discussion unit from the backside by using a rod-shaped tool or a similar tool. Further details and potential embodiments will be given below.

With the discussion unit as described above, a high flexibility is given to the conference system. The discussion units may be used as discussion units (for one or two delegates) as well as chairman units. The at least one exchangeable control may, e.g., comprise a microphone button, which allows delegates and chairmen to operate the discussion units according to required functionality. Nevertheless, the conference system can easily be adapted to the requirements of the respective conference hall, and, thus, may be re-used after the conference in other facilities and/or for other conferences, e.g., for conferences requiring a different number of chairmen and/or delegates. Further, the conference system according to the invention may be adapted to specific requirements of the conference and/or the meeting, such as by adding additional features like voting features or translation features.

An exemplary embodiment of the invention is shown in the drawing and described in further detail in the ensuing description.

BRIEF DESCRIPTION OF THE DRAWINGS

FIG. 2 shows a block diagram of a preferred embodiment of a discussion unit according to the invention;

FIG. 3 shows a preferred embodiment of the exterior design of a discussion unit;

DESCRIPTION OF THE PREFERRED EMBODIMENTS

Figure 1:
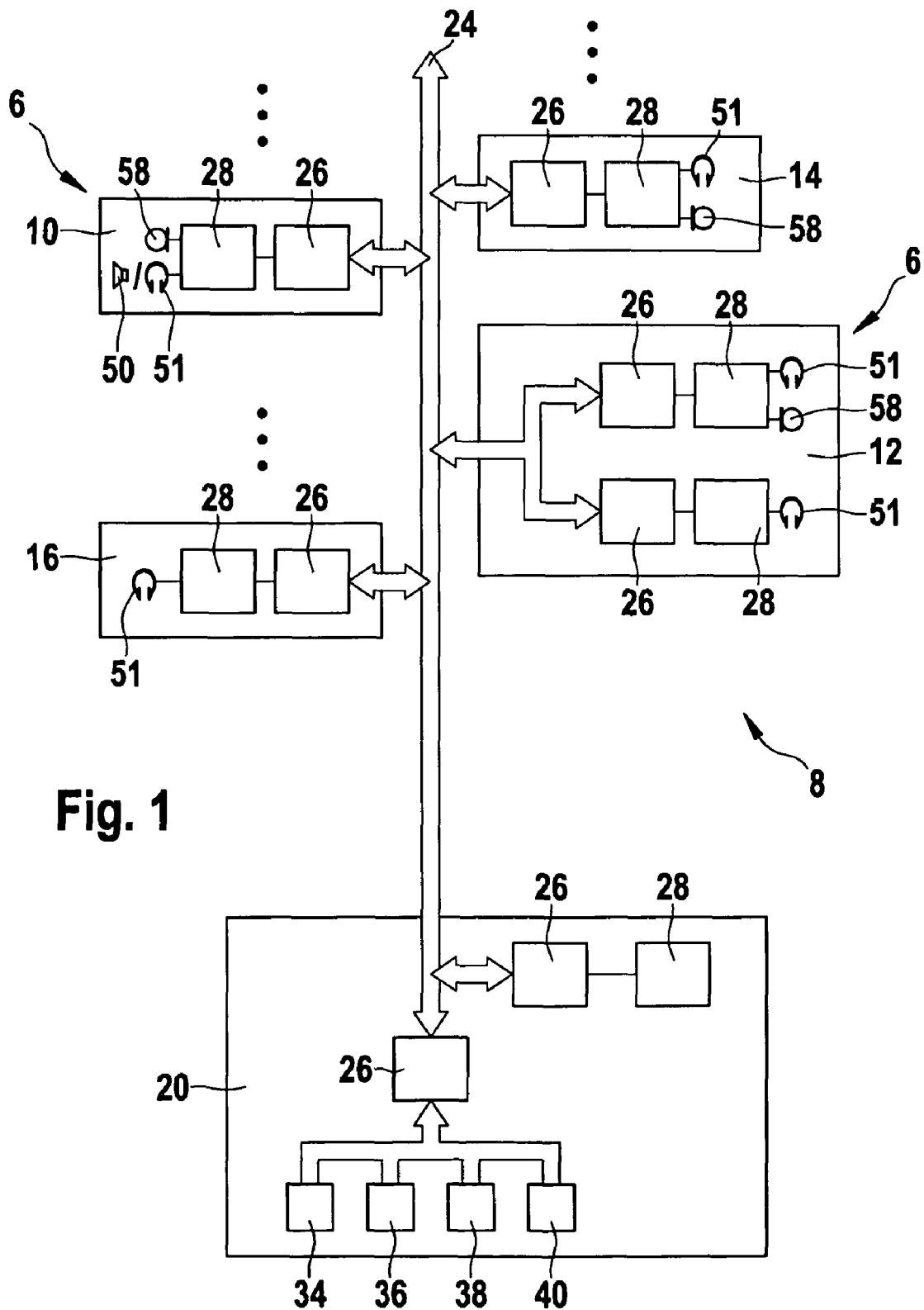
FIG. 1 shows a block diagram of a preferred embodiment of a conference system according to the invention.

FIG. 1 shows a block diagram of a preferred embodiment of a conference system 8 according to the invention. The conference system 8 in this exemplary embodiment comprises a plurality of discussion units 6: discussion units 10 for use by one or more delegates and a chairman unit 12. Other setups of the conference system 8 are possible. The conference system 8 further comprises a central control unit 20 and an audio communication network 24. The delegate discussion units 10, the chairman unit 12, interpreter units 14, language distribution units 16 and the central control unit 20 are connected to the audio communication network 24. In the preferred embodiment, the signal transmission and the signal processing is handled by digital audio technology. The delegate discussion unit 10 comprises a network protocol converter 26, an analogue-digital converter 28, a loudspeaker 50, a headphone 51 and a microphone 58. In the preferred embodiment, the delegate discussion unit 10 allows participants of the conference to access facilities to listen, speak, register a request-to-speak and receive simultaneous interpretation of the floor language.

An embodiment of the delegate discussion unit 10 is shown in FIG. 2 (a detailed description will be given below). The chairman unit 12 comprises network protocol converters 26, analogue-digital converters 28, headphones 51 and a microphone 58. In the preferred embodiment, the chairman unit 12 is adapted to control the conference proceeding. Furthermore, the chairman unit 12 has a microphone priority system that temporarily mutes active microphones 58. The interpreter unit 14 comprises a network protocol converter 26, an analogue-digital converter 28, a headphone 51 and a microphone 58 allowing simultaneous interpretation and distribution of the interpretations to conference participants over the audio communication network 24 to the delegate discussion units 10, the chairman unit 12 and the language distribution unit 16. The language distribution unit comprises a network protocol converter 26, an analogue-digital converter 28 and a headphone 51 allowing people present at the conference in a non-contributing role to listen to any of the interpretations through headphones 51. The central control unit 20 comprises network protocol converters, an analogue-digital converter 28, a read-only-memory 34 (ROM), a random-access-memory 36 (RAM), a flash EPROM 38 and a digital signal processor 40 (DSP). In the preferred embodiment, the central protocol unit 20 provides automatic conference control and microphone management. The network protocol converter 26 connects the analogue-digital converter 28 to the audio communication network 24 and furnishes the network protocol, wherein the analogue-digital converter 28 is a combined analogue-to-digital and digital-to-analogue converter converting the digital signal from the audio communication network 24 to audio, and converting the audio signal to digital.

FIG. 2 shows a block diagram of the discussion unit 10 in a delegate configuration, comprising a processing device 42 and a microphone 58. The discussion unit 10 further comprises a request-to-speak-button 44, a microphone-on-indicator 46 on the discussion unit 10, a request-to-speak-indicator 48 on the discussion unit 10 and a loudspeaker 50. In the preferred embodiment, the processing device 42 controls the discussion unit 10 and furnishes a bidirectional signal connection to the audio communication network 24. The processing device 42 comprises a network protocol converter and an analogue-digital converter. A microphone-on-indicator 46 on the discussion unit 10 indicates to a delegate the microphone-on-state of his/her discussion unit 10, wherein the request-to-speak-indicator 48 on the discussion unit 10 indicates to the delegate the request-to-speak-state of his/her discussion unit 10.

In FIG. 3, a preferred embodiment of a discussion unit 6 is depicted, which can be used either as a delegate discussion unit 10 or as a chairman unit 12. Thus, the discussion unit 6 includes components and means for performing the functionalities of both the chairman unit 12 and the delegate discussion unit 10 as described above with regard to the preceding Figures. Alternative or additional functionalities may be included.

The discussion unit 6 comprises a casing 410, which may comprise materials, such as plastics, wood or metal, of various colors or designs. The casing 410 comprises an operating panel 412, which comprises a flat panel base 414. Further, the operating panel 412 comprises a number of operating elements, which are symbolically denoted by reference number 416. These operating elements 416 comprise an exchangeable control 420, which, in this exemplary embodiment, comprises a microphone push-button 418. The discussion unit 6 further comprises a microphone 58 and a loudspeaker 50.

Alternatively or additionally, separate microphones 58 and/or separate loudspeakers 50 may be connected to the discussion unit 6, such as a separate stand-alone-microphone 58 and/or earphones instead of a loudspeaker 50.

Figure 3A:
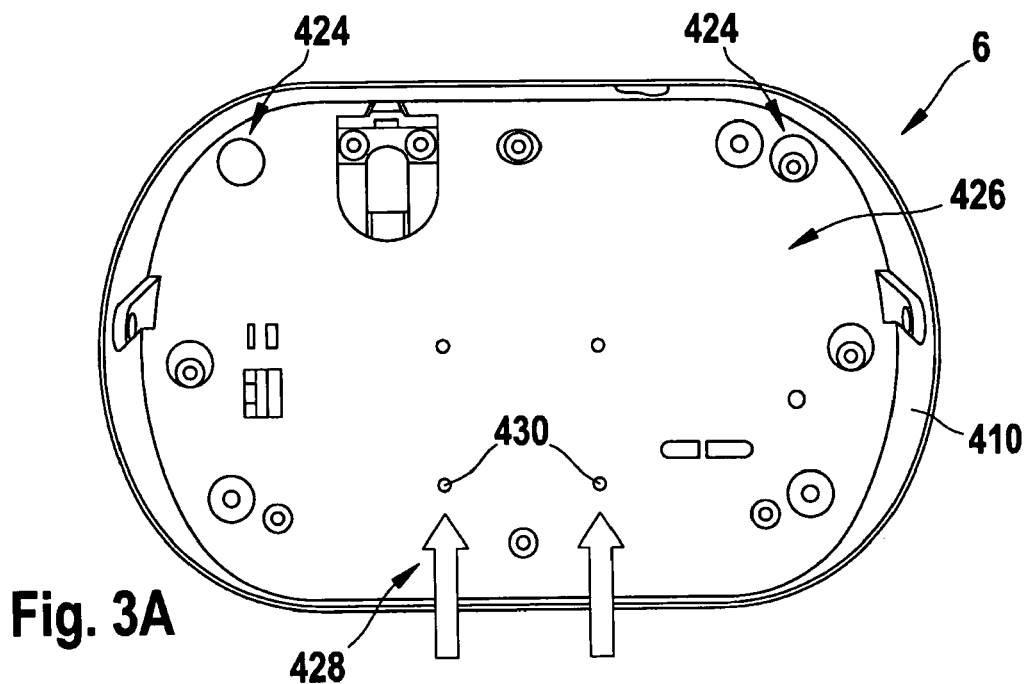
FIG. 3A shows the backside of the discussion unit according to FIG. 3.

The discussion unit 6 further comprises a configuration switch 422, which is placed inside the casing 410, and which is accessible only when the casing 410 is disassembled. This disassembly may be performed by loosening screws 424 on the backside 426 of the casing 410, which is depicted in FIG. 3A. The configuration switch 422 may be designed as a common dip-switch and is not visible in FIGS. 4 and 4A.

By configuring the discussion unit 6 using the configuration switch 422, the discussion unit may be configured to be used either as a discussion unit 10 to be used by one or two delegates, or to be used as a chairman unit 12 for use by a chairman of the conference. Thus, each discussion unit 6 can operate in a number of different modes. These modes are described in more detail below, with respect to FIGS. 5A to 5D.

In order to allow for the exchangeable control 420 to operate the discussion unit 6 according to the different functionalities of these different modes, the microphone push-button 418 can be replaced by one or two different push-buttons 418. For this purpose, the procedure required for removing the push-button 418 is depicted in FIG. 3. The discussion unit 6 comprises an ejector facility 428 in this embodiment according to FIGS. 4 and 4A, the ejector facility 428 comprises two ejector openings 430, which are basically cylindrical holes in the operating panel 412 and the backside 426 of the casing 410. On the operating panel 412, these ejector openings 430 are located within a push-button recess 432, which receives the push-button 418. The push-button 418 itself comprises pins 434, which are adapted to match with the ejector openings 430.

For removing the push-button 418, an ejector tool 436 may be used, which comprises two parallel arms 438 suited for being pushed through the ejector openings 430 from the backside 426 of the casing 410, in order to push the pins 434 of the push-button 418 out of the ejector openings 430 in the panel base 414 of the casing 410 (pushing direction 440).

Figure 4:
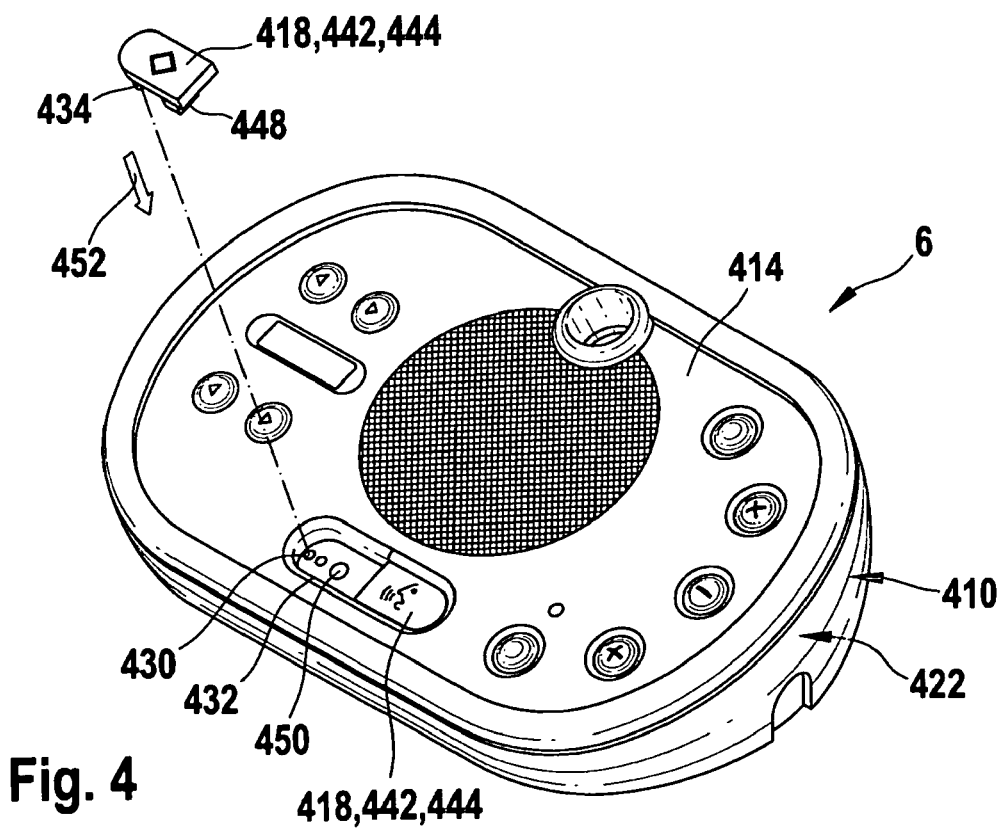
FIG. 4 shows an embodiment of the discussion unit according to FIG. 3 with a split push-button.

In FIG. 4, a replacement of the push-button 418 is depicted. In this case, the push-button 418 is designed as a split-button 442, comprising a left pushbutton 444 and a right push-button 446, which have to be inserted separately into the push-button recess 432. The designs of the left push-button 444 and the right push-button 446 are described below. Each of the split buttons 442 comprise pins 434 suited to be inserted into the ejector openings 430. Further, each of the split push-buttons 442 comprises a die-part 448, which is arranged to operate a corresponding sensor pad 450 within the push-button recess 432. In FIG. 3, the die-parts 448 of push-button 418 are not visible, and, when pushing the single push-button 418, both sensor pads 450 are operated simultaneously. For installation of the split button 442 according to FIG. 4, both the left push-button 444 and the right push-button 446 have to be inserted into the push-button recess 432 (insertion direction 452).

Figure 5A:
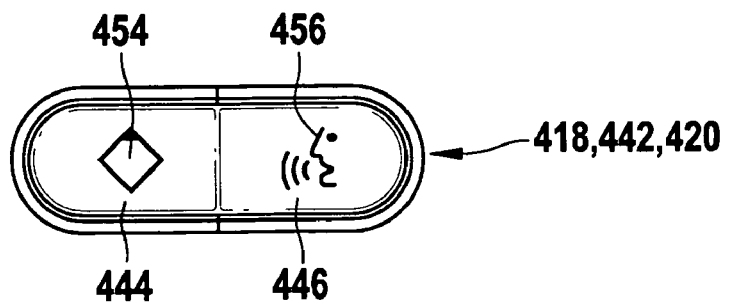
FIGS. 5A to 5D show embodiments of the design of a push-button.
Figure 5B:
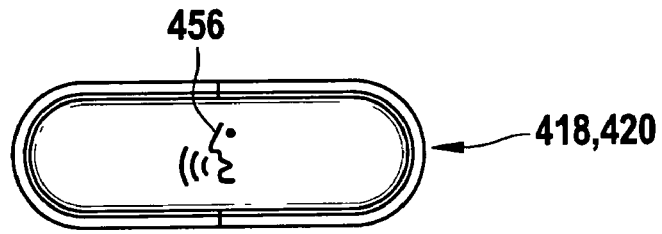
Figure 5C:
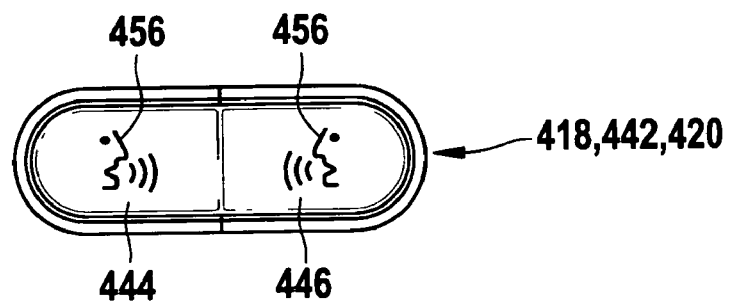
Figure 5D:
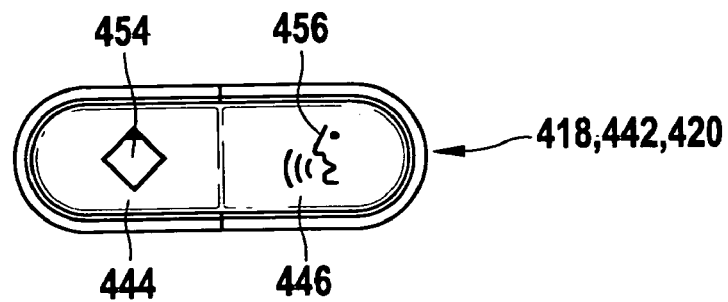

In FIGS. 5A to 5D, a set of push-buttons 418 is depicted, which can be used for different modes of operation of the discussion unit 6. Out of this set of push-buttons 418, the push-buttons 418 depicted in FIGS. 5A, 5C and 5D are split push-buttons 442, according to the description given with reference to FIG. 4. The different modes of operation of the discussion unit 6 according to the invention shall be described with reference to these FIGS. 5A to 5D.

In FIG. 5A, a push-button 418 (designed as a split button 442) is depicted, which can be used for a first mode of operation, which is the "chairman mode". When the configuration switch 422 switches the discussion unit 6 into the chairman mode, the discussion unit 6 acts as a chairman unit 12. In this case, the components of a chairman unit 12 as described above with reference to FIG. 1 are active. The chairman unit 12 is a device for just one chairman.

The split button 442 depicted in FIG. 5A shows a control symbol 454 on the front surface of the left push-button 444, and a speak symbol 456 on the right push-button 446. In the chairman mode, the right push-button 446 may, e.g., be used by a chairman to activate his microphone 58, in order to add comments to the discussion or, e.g., in order to announce the next speaker. The chairman may use the right push-button 446 to speak (even if a maximum number of open microphones 58 has been reached). The left push-button 444 may be used in order to control the functionality of a discussion unit 10, e.g. in order to overrule a discussion, which, e.g., means that all microphones 58 of the delegates are switched off momentarily, and, optionally, a chime is produced by the conference system. Other or alternative functionalities of the chairman mode are possible, in order to temporarily mute the speaker's discussion unit 10, e.g. by changing the mode of the discussion unit 10 from a speak-state (66, 68) into a mute-state (60, 62, 64) or vice versa. Other control functionalities may be connected with the left push-button 444, which are unique to the chairman unit 12.

In FIG. 5B, a preferred embodiment of a push-button 418 is depicted, which can be used in a second operating mode of the discussion unit 6, which is a single user delegate mode. In this single user delegate mode, the configuration switch 422 configures the discussion unit 6 to be a discussion unit 10, in order to be used by a delegate of the conference. In this single user delegate mode, the discussion unit 6 is a discussion unit 10 for just one delegate.

In this case, the push-button 418 only comprises the speak symbol 456. In this case, the push-button 418 may have the functionality of the request-to-speak button 44, as described above. Further, additionally, the push-button 418 may be illuminated, in order to e.g. further comprise the functionalities of the microphone-on-indicator 46, the request-to-speak-indicator 48 and/or the microphone-on-indicator 54 or, alternatively, a combination of some of these functionalities, as described above with reference to FIG. 2.

In a third mode of operation of the discussion unit 6, the configuration switch 422 is set to a "dual user delegate mode". In this mode, the discussion unit 6 can be used by two delegates of the conference, which reduces the costs of the conference system 8. In this mode, the conference system 8 regards the discussion unit 6 to be two separate discussion units 10 (which share physical components), but it only gives one single address to this discussion unit 10.

In this mode, the push-button 418 again is a split button 442, wherein the left push-button 444 and the right push-button 446 each have the functionalities of the push-button according to FIG. 5B. Both the left push-button 444 and the right push-button 446 exhibit the speak symbol 456. Additionally, in the dual user mode, the discussion unit 10 may comprise a dual volume control or dual channel selectors, such as for each of the two delegates to be able to select a separate channel for language translation.

In a fourth mode of operation, the discussion unit 6 operates in a "single user delegate mode with auxiliary control". In this mode, the push-button 418 as depicted in FIG. 5D should be installed, which may be identical to the push-button 418 as depicted in FIG. 5A, and which should be a split button 442. The right push-button 446 basically has the same functionality as the push-button 418 as depicted in FIG. 5B. The left push-button 444 can be used as an auxiliary control. Thus, this auxiliary control can be used in order to activate an indicator. The discussion unit 10 may comprise a dual volume control and/or a channel selector and/or a dual channel selector. Further, the left push-button 444 may be used in combination with voting facilities.

The invention claimed is:

1. A discussion unit in a conference system and connectable to at least one second discussion element of the conference system, said discussion unit comprising means for switching between at least two operating modes; at least one exchangeable control out of a set of controls including at least one control for each of the operating modes, said at least one exchangeable control being configured to indicate to a user an operating mode currently used and to allow the user to control the discussion unit; a casing; and a configuration switch for configuring the discussion unit to operate in one of the operating modes, wherein the configuration switch is accessible only when the casing is in a disassembled state; and an ejector facility including at least one opening which allows for a user to push said at least one exchangeable control out of said casing.

2. A discussion unit as defined in claim 1; and further comprising means for operating at least two operating modes including a single user delegate mode in which the discussion unit is a discussion unit for a single delegate participating in a conference, a dual user delegate mode in which the discussion unit is a discussion unit for two delegates participating in the conference, and a chairman mode in which the discussion unit is a chairman unit adapted to control a state of at least one microphone of the discussion unit.

3. A discussion unit as defined in claim 2, wherein said means for operating said at least two of operating modes is configured so that in the chairman mode the discussion unit controls the state of at least one microphone by switching the state from a speak-state into a mute-state or vice versa.

4. A discussion unit as defined in claim 2; and further comprising means for operating a single user delegate mode with auxiliary control so that in the single user delegate mode a discussion unit is a discussion unit for a single delegate participating in a conference, and the discussion unit offers to the delegate an auxiliary control option.

5. A discussion unit as defined in claim 2; and further comprising at least one additional exchangeable control out of the set of controls and including at least one control for each of the operating modes, wherein at least one additional exchangeable control is adapted to indicate to a user an operated mode currently used and to allow for the user to control the discussion unit.

6. A discussion unit as defined in claim 1, wherein said exchangeable control includes at least one exchangeable push-button.

7. A discussion unit as defined in claim 6, wherein said exchangeable push-button includes a split push-button, offering at least two separate control features.

8. A discussion unit as defined in claim 1, and further comprising a casing; and at least one ejection facility which is configured to allow for a user to remove said at least one exchangeable control from said casing.

9. An ejector tool to be used for a discussion unit in a conference system and connectable to at least one second discussion element of the conference system, said discussion unit comprising means for switching between at least two operating modes, at least one exchangeable control out of a set of controls including at least one control for each of the operating modes, said at least one exchangeable control being configured to indicate to a user an operating mode currently used and to allow the user to control the discussion unit, with a casing, wherein the ejector tool has a tool element configured with two parallel arms for pushing a pair of pins comprising the at least one exchangeable control, which pair of pins are inserted in ejector openings within the casing, in order to eject and remove the at least one exchangeable control from the casing.

10. A conference system, comprising at least two discussion units each provided in a conference system and connectable with one another, wherein each of said discussion units includes means for switching between at least two operating modes, at least one exchangeable control out of a set of controls including at least one control for each of the operating modes, said at least one exchangeable control being configured to indicate to a user an operating mode currently used and to allow the user to control the discussion unit, and at least one additional exchangeable control out of the set of controls and including at least one control for each of the operating modes, wherein the at least one additional exchangeable control is adapted to indicate to a user an operated mode currently used and to allow for the user to control the discussion unit; a casing; and a configuration switch for configuring the discussion unit to operate in one of the operating modes, wherein the configuration switch is accessible only when the casing is in a disassembled state; and an ejector facility including at least one opening which allows for a user to push said at least one exchangeable control out of said casing.

* * * * *